W. A. NEWTON.
TROWEL.
APPLICATION FILED OCT. 26, 1911.
1,021,945.
Patented Apr. 2, 1912.
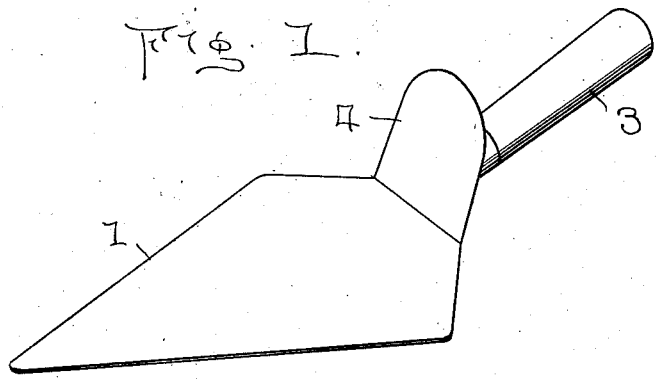
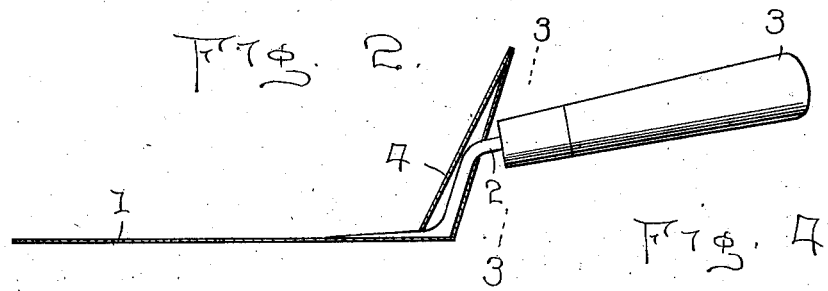
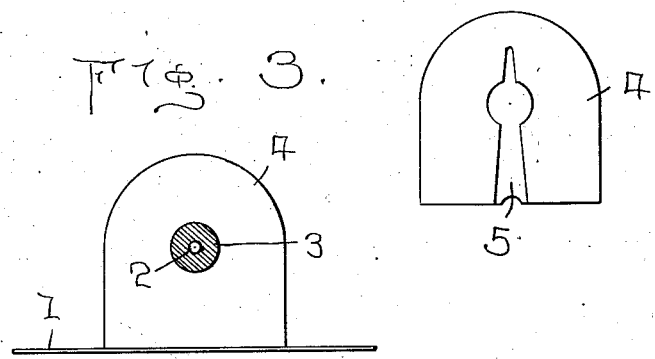
WITNESSES:
INVENTOR
W. A. Newton
BY
Attorneys

UNITED STATES PATENT OFFICE.

WILLIAM ANDERSON NEWTON, OF RICHMOND, VIRGINIA.

TROWEL.

1,021,945.  Specification of Letters Patent.  Patented Apr. 2, 1912.

Application filed October 26, 1911. Serial No. 656,925.

*To all whom it may concern:*

Be it known that I, WILLIAM ANDERSON NEWTON, a citizen of the United States, residing at Richmond, in the county of Henrico and State of Virginia, have invented certain new and useful Improvements in Trowels; and I do hereby declare the following to be a full, clear, and exact description of the invention, such as will enable others skilled in the art to which it appertains to make and use the same.

My invention relates to new and useful improvements in trowels and more particularly to a trowel provided with a guard for protecting the hand of the user from the material being lifted.

Other objects and advantages of my invention will be hereinafter made clearly apparent in the specification and pointed out in the claims.

In the accompanying drawings I have shown the preferred form of my invention.

In the said drawings, Figure 1 is a perspective view, showing the usual form of mortar trowel provided with my improved form of guard. Fig. 2 is a longitudinal sectional view therethrough. Fig. 3 is a sectional view as seen on line 3—3, Fig. 2, and, Fig. 4 is a rear view of a removable form of guard adapted to be secured to the usual form of trowel.

Referring to the drawings by numerals of reference, similar reference numerals designating corresponding parts throughout the several views, 1 is the blade of a trowel, which is provided at one end with an upwardly and rearwardly extending shank 2. A handle 3 is secured to the rear end of the shank 2, by means of which the trowel may be manipulated. A guard 4, which may be formed integrally with the blade of the trowel or separately, is disposed at the rear end of said blade so as to protect the hand of the user from the mortar or other material with which the trowel is used.

In Fig. 1, I have shown a trowel having a guard which is formed integrally with the blade of the trowel and extends upwardly and rearwardly in front of the handle.

In Figs. 2 and 3, I have shown a trowel provided with a guard formed of one piece bent upon itself, one portion having an aperture therein to receive the shank 2 of the trowel, the free end of the shank being secured to the blade 1.

In Fig. 4, I have shown a form of guard formed of one piece and bent upon itself, one portion thereof being provided with a slot 5 enlarged at one portion, so that the guard may be slipped over the shank of a trowel and forced thereon until said shank is disposed in the enlarged portion of the slot. By this means the guard may be removably secured to the shank of an ordinary trowel.

My invention is particularly adaptable to use on trowels to be used in the handling of mortar. The provision of a guard prevents the soft mortar from coming in contact with the hands of the user and also enables a larger quantity of mortar to be lifted at a time.

What I claim as new is:

1. A trowel comprising a blade, a shank secured thereto, a handle secured to said shank, and a guard formed of one piece and bent upon itself, one portion of the said guard being provided with an opening to receive the end of said shank, the other portion of said guard engaging against the opposite side of said shank and the blade to form a seal.

2. The combination with a trowel having a blade, a shank extending upwardly and rearwardly of said blade, and a handle secured to said shank, of a guard formed of one piece and bent upon itself, one portion of said guard having a slot enlarged at one portion thereof and receiving said shank to hold said guard in position, the other portion of said guard engaging said blade.

3. As an article of manufacture, a guard for bladed tools comprising one piece bent upon itself, one portion of said guard having a slot therein enlarged at one portion and adapted to receive a part of a tool, the other portion of said guard being adapted for engagement with a second part of a tool.

In testimony whereof I have signed my name to this specification in the presence of two subscribing witnesses.

WILLIAM ANDERSON NEWTON.

Witnesses:
 B. S. WILLIAMS,
 WILLIAM ELSWORTH.

Copies of this patent may be obtained for five cents each, by addressing the "Commissioner of Patents, Washington, D. C."